(12) United States Patent
Jenkins et al.

(10) Patent No.: US 7,660,951 B2
(45) Date of Patent: *Feb. 9, 2010

(54) ATOMIC READ/WRITE SUPPORT IN A MULTI-MODULE MEMORY CONFIGURATION

(75) Inventors: Steven K. Jenkins, Raleigh, NC (US); Laura A. Weaver, Chapel Hill, NC (US)

(73) Assignee: Inernational Business Machines Corporation, Armonk, NY (US)

(*) Notice: Subject to any disclaimer, the term of this patent is extended or adjusted under 35 U.S.C. 154(b) by 7 days.

This patent is subject to a terminal disclaimer.

(21) Appl. No.: 12/037,309

(22) Filed: Feb. 26, 2008

(65) Prior Publication Data

US 2008/0147996 A1    Jun. 19, 2008

Related U.S. Application Data

(63) Continuation of application No. 10/931,705, filed on Sep. 1, 2004, now Pat. No. 7,360,035.

(51) Int. Cl.
*G06F 13/00* (2006.01)

(52) U.S. Cl. .................... 711/150; 711/5; 711/130; 711/151; 365/200; 345/558

(58) Field of Classification Search ................ 711/150, 711/5, 130, 151; 365/200; 345/558
See application file for complete search history.

(56) References Cited

U.S. PATENT DOCUMENTS

| | | | |
|---|---|---|---|
| 5,265,233 A | 11/1993 | Frailong et al. | |
| 6,002,412 A * | 12/1999 | Schinnerer | 345/558 |
| 6,055,605 A * | 4/2000 | Sharma et al. | 711/130 |
| 6,463,072 B1 | 10/2002 | Wolrich et al. | |
| 6,484,224 B1 | 11/2002 | Robins et al. | |
| 6,900,812 B1 | 5/2005 | Morein | |
| 7,295,553 B2 | 11/2007 | Saitoh | |
| 2002/0071321 A1* | 6/2002 | Barri et al. | 365/200 |
| 2002/0083297 A1 | 6/2002 | Modelski et al. | |
| 2002/0169921 A1* | 11/2002 | Saitoh | 711/5 |
| 2006/0012603 A1 | 1/2006 | Lindholm et al. | |

* cited by examiner

*Primary Examiner*—Tuan V Thai
*Assistant Examiner*—Yong Choe
(74) *Attorney, Agent, or Firm*—Patrick J. Daugherty; Driggs, Hogg, Daugherty & Del Zoppo Co., LPA

(57) ABSTRACT

Efficient transfer of data to and from random access memory is described. Multiple request sources and a memory system comprise memory modules having memory banks, each bank containing rows of data. The retrieval comprises transferring all data pursuant to a given request by one source before any data is transferred pursuant to a subsequent request from said second source. This retrieval is achieved using a memory arbiter that implements an algorithm for atomic read/write. Each bank is assigned a FIFO buffer by the arbiter to store access requests. The access requests are arbitrated, and an encoded value of a winner of arbitration is loaded into the relevant FIFO buffer(s) before choosing the next winner. When an encoded value reaches the head of the buffer, all associated data is accessed in the given bank before accessing data for another request source.

15 Claims, 3 Drawing Sheets

ATOMIC READ/WRITE SUPPORT IN A MULTI-MODULE MEMORY CONFIGURATION

CROSS REFERENCE TO RELATED APPLICATIONS

This application is a continuation of application Ser. No. 10/931,705, filed Sep. 1, 2004.

This application is related to the following patents: namely, U.S. Pat. No. 6,460,120 B1, issued Oct. 1, 2002 entitled NETWORK PROCESSOR, MEMORY ORGANIZATION AND METHODS, and U.S. Pat. No. 6,463,500 B1, issued Oct. 8, 2002 entitled APPARATUS AND METHOD TO ACCESS COMPUTER MEMORY BY PROCESSING OBJECT DATA AS SUB-OBJECT AND SHAPE PARAMETER. The contents of each of these two patents are hereby incorporated by reference into the present description as fully as if they were represented herein in their entirety.

FIELD OF THE INVENTION

This invention relates generally to processor complexes and to their memory systems that store different size blocks of information data in memory modules. More particularly, it relates to the efficient accessing of data stored in dynamic random access memory modules and to a method for data access implemented in digital circuits.

BACKGROUND OF THE INVENTION

The discussion relating to the present invention will be better understood with reference to the terms that are defined generally as indicated.

Arbiter—digital circuit whose function includes arbitrating amongst multiple simultaneous read and/or write access requests from multiple processors for access to a shared memory system.

Atomic—an operation in which a block of data is fully read from or written to memory without any other intervening process reading from or writing to the same block of data.

Data block—data of a particular size that is written to or is read from a memory system. The size of a block is defined by two parameters, width and height. The width denotes the number of consecutive banks in which the block is stored. The height denotes the number of consecutive address locations or rows on a single memory module at which the block is stored.

Bank—partition of data within a DRAM module; an address and a bank number must be applied when reading or writing a DRAM module. Typical DRAM modules are comprised of multiple (four or eight) banks.

FIFO buffer—first in and first out buffer queue.

Memory system—a collection of discrete memory modules, such as DRAM and SRAM, each module having a plurality of addresses or locations in which blocks of data can be accessed. The modules may be attached to or integrated into a network processing chip or other type of processor chip. Multiple DRAM modules can be used in parallel to construct a memory system containing many banks.

Window—a number of clock cycles during which the banks of a DRAM module may be accessed. Since only one bank of a DRAM module can be accessed at a given time (the address and bank number must be applied), the banks of a module are accessed consecutively over time in order to maximize the bandwidth. For a four-bank DRAM module, for instance, the banks are accessed in the order of A B C D A B C D. One set of accesses (A B C D) is a "window", and takes a fixed number of clock cycles, depending on the type and speed of the DRAM. A window is typically between 10 and 12 clock cycles in duration.

A network processor incorporates multiple general purpose processors and specialized logic. The memory systems that are generally used with network processors are comprised of memory modules which often include SRAM and DRAM. Each memory module has a plurality of memory addresses and, in the case of DRAM modules, data that is for a given address is partitioned into multiple banks. When a DRAM module is accessed, a memory address and a bank number must be supplied. In many cases, a block of data being accessed by one of the general purpose processors cannot fit into a single memory location or bank within a memory module, thereby necessitating the allocation of the data into different memory locations within the same module or in another module. Some of these locations can be in DRAM memory whereas others may, for example, be located in SRAM memory.

As noted above in the definitions, since only one bank can be accessed at a time in a given DRAM, bandwidth to and from the DRAMs is improved by accessing the banks consecutively in a Time-Division Multiplexed (TDM) fashion. In the case of four-bank DRAM modules, banks A, B, C and D can be accessed during one TDM window. It should be noted that during the TDM window, the address associated with each bank is independent. So, in a given window, one could read address 0 of bank A and address 5 of bank B. In addition, each window is designated as a "preferred read" or a "preferred write" window, meaning that bank accesses within the window are all read accesses or all write accesses (not mixed). If the banks were accessed randomly, rather than in a TDM fashion, the bandwidth would be reduced due to the insertion of additional cycles between accesses to meet the timing requirements of the DRAM module(s). Similarly, if read and write operations were mixed within a window, the DRAM timing requirements necessitate insertion of additional cycles between read and write accesses, thereby reducing bandwidth. It should be noted that it is not required that every bank be accessed during every window. For example, if banks A, C and D need to be read during a certain window, they will be accessed, but bank B will remain idle.

In a network processing environment, multiple processors may be independently accessing the memory module(s) attached to a network processing chip. The memory system contains routing information which the general purpose processor uses to determine how to route information. Periodically, one of the general purpose processors updates this routing information by writing a block of data to the memory system. Since these processors operate independently, it is imperative that the digital circuits of the arbiter (see above definition) preclude one processor from writing to a given block of memory while another processor is attempting to read all or part of the same memory block. Otherwise, the processor attempting read access could get partially updated routing information.

The problem is exacerbated by the fact that the data block may be spread across multiple banks of a DRAM module, and across multiple addresses (rows) in the module. The same challenges are present in any system in which multiple processors attempt to independently access data blocks which are stored in a memory system comprised of multiple modules, DRAM and/or SRAM. Thus, an "atomic" operation means that a block of data is completely read from or written to a memory system without any other process writing or reading any portion of the same data block at the same time. Two common methods of achieving atomic operations are as follows. In some multi-processor systems, semaphores are used to lock very large areas of memory, referred to as "pages". Pages may contain hundreds or even thousands of data blocks. Therefore, when a page is locked by one processor, access by any other processor to any data block within the page is prohibited, even if logic blocks being requested by the two processors are different. This method has a definite latency penalty.

A second method of achieving atomic operations is to allow all of the read or write accesses required to service a particular processor's request for a data block without allowing any other read or write operations to occur. This method degrades bandwidth to and from the memory system, since a data block may not include all banks of a DRAM module. For example, if a data block spans banks A, B and C, and a second data block spans banks B, C and D, this method would require reading or writing the first data block completely, then reading or writing the second data block completely.

FIG. 1 shows examples of various sizes of data blocks and how they are mapped to the addresses and banks of a four-bank DRAM module. As noted above in the definitions, each data block has a unique size defined by its height and width. Because different types of information may be stored in the memory system, data blocks are different sizes. Some data blocks are limited to one bank and one address, while other data blocks span several banks and several addresses. A data block having a width greater than 1 must be stored in multiple banks within a DRAM module. Similarly, if the data block has a height greater than 1, it occupies more than one address within a bank.

Data block 106 is stored in a DRAM memory module 110. It has a height of 3 and a width of 1; thus, it occupies three consecutive memory addresses 1, 2 and 3. In addition, only bank A is included in this data block. Data block 107 is stored in memory module 112; it has a height of 2 and a width of 4. It occupies two consecutive memory addresses 12 and 13, and spans all memory banks (A, B, C and D).

SUMMARY OF THE INVENTION

Among the objects and advantages of present invention are the following:

An object of the present invention is to solve the problem of maximizing bandwidth between multiple processors, requesting different size data blocks, and a memory system, while insuring that all processors' accesses are atomic.

One advantage of the invention is that processors can independently access a block of data in a common memory device without adversely affecting any other processor which also has access to that memory device. In other words, multiple data blocks of different sizes can be accessed by different processors at the same time, while the accesses are atomic to each processor.

Another advantage is that latencies for processors waiting to access blocks of memory are reduced.

Still another advantage is that locking of large blocks of memory which may occur in the prior art devices is eliminated. In the present invention, a processor does not need to wait for other processors to unlock sections of memory, thereby increasing bandwidth between the processors and the memory system.

Yet another advantage is that information in a common memory device can be updated without interruption.

This invention allows accesses to different addresses for each bank during a window. Thus, simultaneous access to the same or different data block by different processors is possible.

These and other objects and advantages, which will become manifest upon reading and a full understanding of this invention, are achieved in the manner to be hereinafter described.

The invention relates to a system and a method for granting atomic access to blocks of data in memory modules of a memory system shared by multiple processors. The atomic access of each request from a processor to an arbiter is preserved without intervention from another request. The blocks of data are stored in at least one row of at least one bank in memory system. The memory system comprises one or more memory modules. Each memory module comprises one or more banks of data and each bank employs a FIFO buffer which stores memory access requests to the bank. The banks of each memory module are accessed consecutively. For example, one DRAM memory module may have four banks of data designated as banks A, B, C, D and are accessed consecutively in the designated order. One set of consecutive accesses comprises a window requiring a fixed number of clock cycles. For example, a DRAM memory module with four banks could be accessed in a window of 10 to 12 clock cycles depending on the speed or type of DRAM. The arbiter designates each window as a preferred read or a preferred write window and dedicates a window to a given designation if the head, or top, entry in any of the bank FIFO buffers requests an operation matching the preference. However, the arbiter dedicates the window to the opposite operation if the head, or top, entry in all of the bank FIFO buffers does not match the preferred operation. A further significant feature is that each of the multiple processors is limited to one request to the arbiter, thereby limiting the maximum depth of the queue in a FIFO buffer to the total number of processors allowed to access a given bank. The arbiter uses an algorithm to determine the priority of the access requests. One such algorithm grants access in a round robin manner. Then, an encoded value of the winner of arbitration is loaded into each of the FIFO buffers associated with the banks within the memory modules which contain the data block being accessed by the winner. Only after the encoded value of the winner is loaded into all of the relevant FIFO buffers is a new winner chosen by the selection algorithm. When an encoded value reaches the head of the FIFO buffer, all of the data within the given bank is accessed for the processor associated with the encoded value. After all of the data for the given bank has been accessed, the encoded value at the head of the FIFO buffer is discarded and the next encoded value becomes the head.

The invention also relates to a computer system having multiple general purpose processors, and a memory access device for accessing data stored in the memory system. The device comprises an arbiter including an atomic read and write function. This function includes (i) a FIFO buffer for each bank within the memory system; and (ii) a selection algorithm to chose one general purpose processor requesting access to the memory system to be the winner and load an encoded value associated with the winner into all of the FIFO buffers associated with the memory banks to be accessed by the request before choosing another winner; and (iii) a function that accesses all of the data within one memory bank for the memory access request of the general purpose processor associated with the encoded value that is at the head, or top, of the FIFO buffer associated with the memory bank before accessing data within the memory bank for another general purpose processor. The memory system consists of one or a plurality of memory modules, each comprising one of a plurality of memory banks, each bank including multiple rows. Each bank uses a dedicated FIFO buffer to queue memory access requests from the multiple general function processors into the bank. All data for a given data block requested by one processor, which is stored in a specific bank of a specific memory module, is transferred before any data from that bank can be accessed by a second processor. Thus, from the standpoint of each processor, accesses to and from the memory system appear to be atomic. A memory module useful in the invention is a DRAM memory, having four banks that are accessed consecutively as banks A, B, C and D. The arbiter includes an algorithm for processing access requests. The algorithm limits each processor to one request to the arbiter, thus limiting the maximum depth of a FIFO buffer queue to the total number of processors that are allowed to access a bank.

BRIEF DESCRIPTION OF THE DRAWINGS

The present invention will now be described with specific reference to the drawings in which.

DETAILED DESCRIPTION OF THE INVENTION

Figure 1:
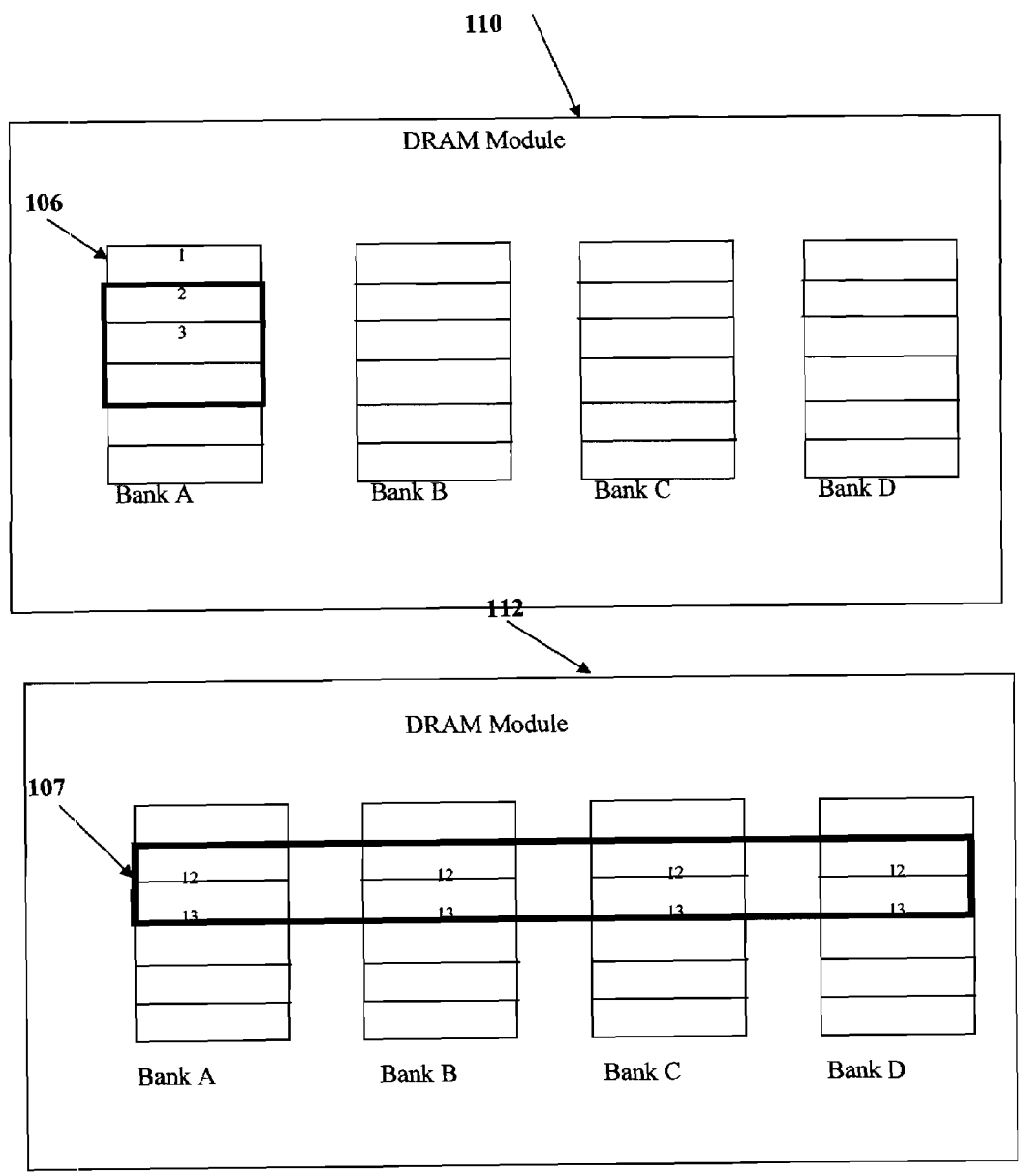
FIG. 1 is a diagrammatic representation of an exemplary memory module useful in the teachings of the present invention.

According to the present invention, an atomic read/write function is implemented per data block transferred, such that all the data in a data block requested by one processor from a given location in memory is transferred before the same data block is transferred to or from another processor. This procedure solves the stated problem with an atomic read and write function in the memory arbiter of the network processing chip.

The invention is implemented in hardware, i.e. digital circuits, and no software is used. Each bank of each memory module has an associated FIFO buffer. Thus, each DRAM will have multiple FIFO buffers (four or eight depending on the DRAM module architecture). In memory systems containing SRAMs, each SRAM is viewed as having one bank and, thus, one FIFO buffer. It should be noted that a data block can span multiple SRAMs, and can span SRAMs plus DRAMs, depending on the architecture of the memory system.

The general purpose processors, numbered 0 to N, each executing a software program, make independent, simultaneous read and write access requests to the digital hardware arbiter. From all the processors requesting access to a particular memory module, one processor is chosen by the arbiter as a winner via an algorithm, such as round-robin, and the winning processor's number (0 to N) is loaded into the relevant FIFO buffers(s). This loading of the FIFO buffer(s) with the processor's number is completed before the next winning processor's number is loaded into any of the FIFO buffer(s) to assure that the operations remain atomic.

As noted above in the definitions, the banks of a DRAM module are accessed consecutively (A, B, C, D, A, B . . . ) in order to maximize the data bandwidth. One set of accesses to each bank requires a fixed number of clock cycles, depending on the DRAM module type and speed. Thus, the banks of a DRAM are accessed in a TDM fashion during each window. Further, the arbiter designates each window as preferred for reads or preferred for writes, and alternates the preference every other window. Or the arbiter can designate more "preferred read" windows than "preferred write" windows if it in known that read operations are more common than write operations for a given system. It dedicates the window to a given operation if the head, or top, entry in any of the bank FIFO buffers is requesting an operation that matches the preferred operation for the given memory module. Otherwise, it dedicates the window to the opposite operation if none of the head, or top, entries in the bank FIFO buffers for the given memory module requests an operation that matches the preferred operation. The arbiter retrieves the address to be presented to the memory module bank associated with the FIFO buffer, since bank addresses are independent. Additionally, if the height of the data block being requested is greater than 1, the bank will be accessed multiple times, once per TDM window of the proper access type (read or write) until all accesses for the height are complete. Once all accesses are complete for the given bank (all addresses corresponding to the data block height), the processor number stored in that bank's FIFO buffer is discarded. The operation continues for the next processor number stored in the FIFO buffer.

In this invention, each processor can have only one outstanding request to the arbiter at a given time. Thus, it is not necessary to load the type of access (read or write), address, or data block height into the bank FIFO buffers. In addition, the maximum number of entries required for each bank FIFO buffer to hold, or the depth of the FIFO buffer, need only equal the number of processors in the system. This is merely an implementation detail, and is not a limitation of the invention. If the general purpose processors were allowed multiple outstanding requests, then each bank FIFO buffer would be required to store the type of access, address and data block height, in addition to the processor number. Also, if multiple outstanding requests were allowed per processor, the depth of each FIFO buffer would be required to be equal to the number of total outstanding requests allowed at any given time within the system.

Because (1) the winning processor's number from the arbiter's selection algorithm is loaded into all of the appropriate bank FIFO buffers associated with the requested data block before the next winning processor's number is loaded into any FIFO buffer and (2) when a processor's number reaches the head, or the top, of a bank FIFO buffer, all accesses for the given bank are completed before any other accesses to that bank are performed, the access for a given data block size will always appear to be atomic to the requesting general purpose processor. The access is guaranteed to be atomic on a data block size basis (height and width), and that data block can span multiple banks, multiple addresses, and even multiple memory modules.

Figure 2:
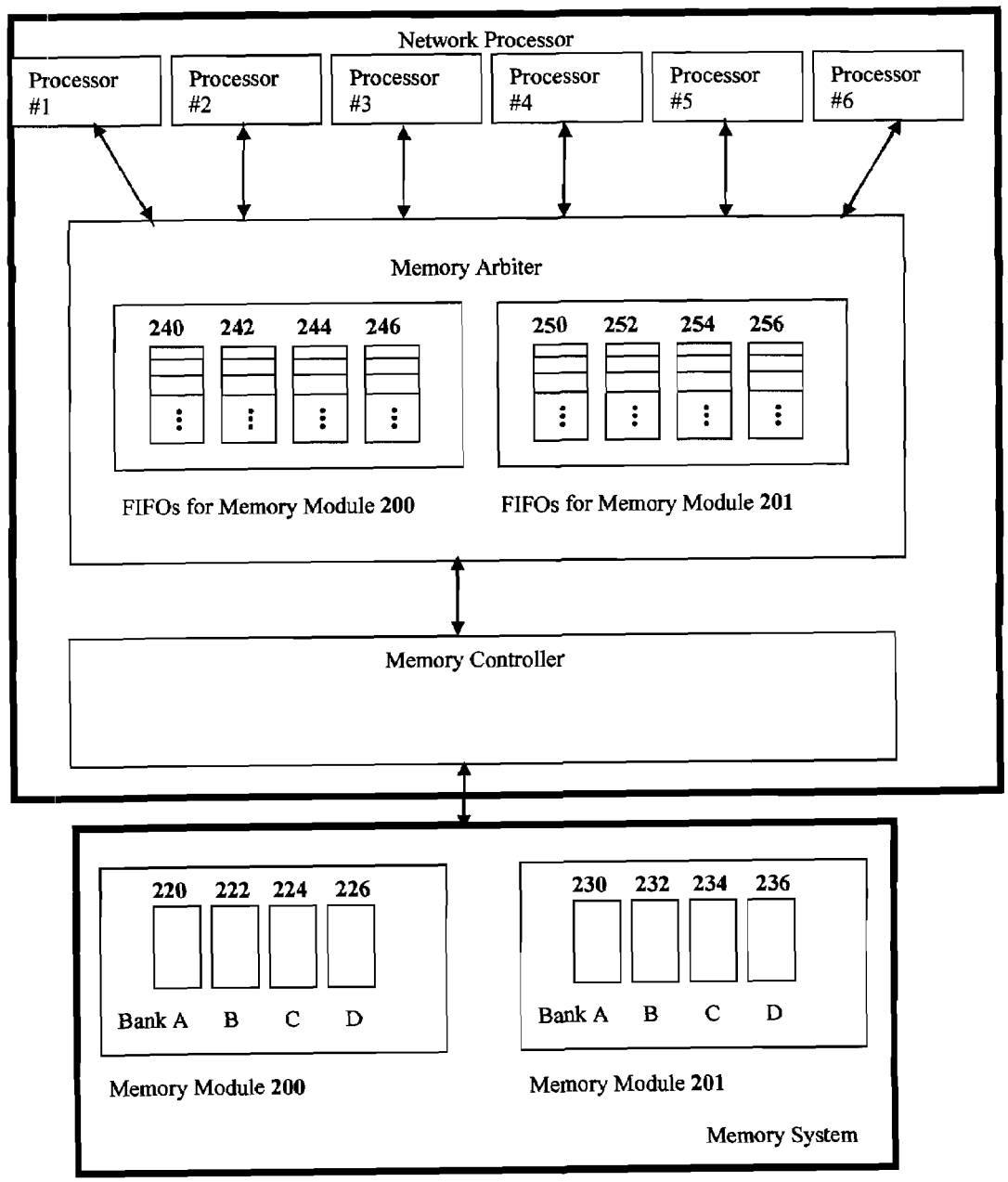
FIG. 2 shows a typical computer system, including the general purpose processors, a memory system, and the arbiter described in the present invention.

Turning again to the drawings, FIG. 2 shows six processors labeled processor #1 (202), processor #2 (204), processor #3 (206), processor #4 (208), processor #5 (210), and processor #6 (212). A DRAM memory module 200 contains four banks labeled Bank A (220), Bank B (222), Bank C (224) and Bank D (226). A DRAM memory module 201 contains four banks labeled Bank A (230), bank B (232), Bank C (234) and Bank D (236). The four FIFO buffers associated with the banks of memory module 200 are labeled 240, 242, 244, and 246. Similarly, the four FIFO buffers associated with the banks of memory module 201 are labeled 250, 252, 254, and 256.

Figure 3:
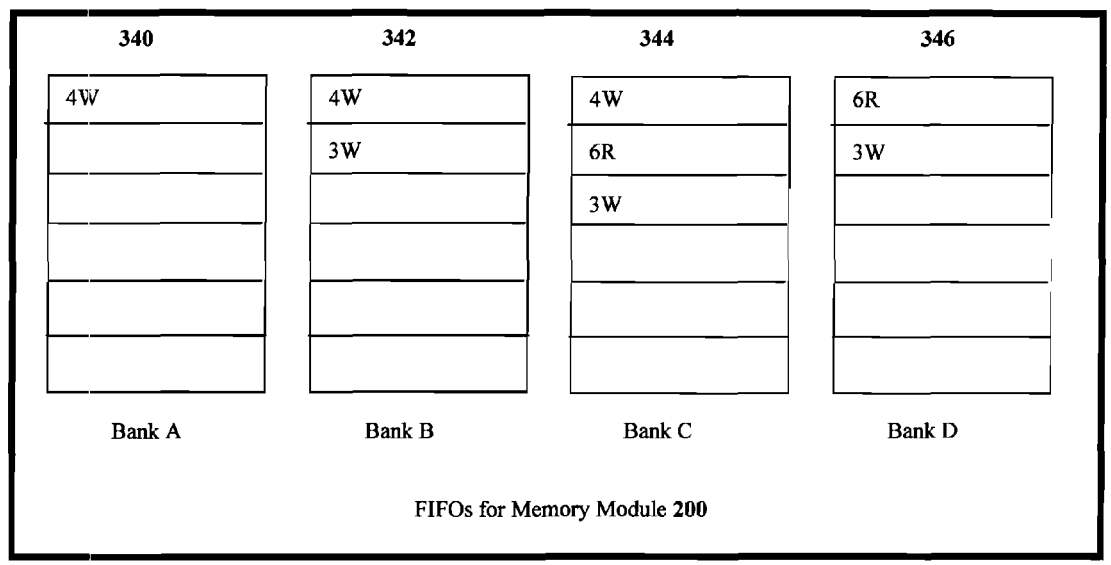
FIG. 3 illustrates requests in the FIFO buffers associated with the banks of a memory module.

FIG. 3 illustrates the contents of the FIFO buffers for the memory module 200 (FIG. 2) in the following scenario. Processor #4 208 has requested write access (4W) to three of the four banks of memory module 200, A, B and C, and for purposes of illustration wins the first round-robin. Processor #6 212 has requested read access (6R) to banks C and D and wins the next round-robin, and processor #3 206 wins the third round-robin and requests a write (3W) to banks B, C and D. Thus, the head, or top, entry in the FIFO buffer for bank A (340) is the write request from processor #4, the head, or top, entry in the bank B FIFO buffer (342) is the write request from processor #4, the head, or top, entry in bank C FIFO buffer (344) is the write request from processor #4, and the head, or top, entry in bank D FIFO buffer (346) is the read request from processor #6. Assuming that processor #4 needs a block of information which spans three addresses (shown as '4W') in the memory module, access for processor #4 in bank C 224, will be completed before the access for processor #6 212 to bank C can begin. Similarly, processor #3 206 must wait for all of the bank C transfers for processor #4 208 and processor #6 212 before accessing bank C 224. In this way, it can be assured that the accesses required for a given shape are atomic.

The memory arbiter 250 interleaves 'read' and 'write' requests in the following manner. Accesses are divided into windows of consecutive clock cycles during which address, enables and read or write requests are presented by the memory arbiter to memory controllers. For a given window, the memory arbiter 250 performs either 'reads' or 'writes' for all banks with outstanding requests. The memory arbiter designates a window as a "preferred read" or a "preferred write" window. The arbiter 250 contains embedded FIFO buffers, one for each bank. For a given memory, if the head, or top, entry in any of the bank FIFO buffers is requesting the type of operation that matches the preferred window, then the window is dedicated to that operation. Otherwise, the window is dedicated to the opposite of the preferred window. In the example above, assume that processor #4 208 wants to write to memory, while processor #6 212 wants to read from memory. If the window is a preferred 'read' window when the memory arbiter examines the bank FIFO buffers, only processor #6 212 will be serviced on bank D in the current window. Processor #4 208 will be serviced on banks A, B and C in the next subsequent window.

The present invention can be realized in hardware, software, or a combination of the two. Any kind of computer system or other apparatus adapted for carrying out the methods described herein is suited. A typical combination of hardware and software could be a general purpose computer system that, when loaded and executed, controls the system such that it carries out the methods described herein. The present invention can also be embedded in a computer program product, which comprises all the features enabling the implementation of the methods described herein, and which, when loaded in a computer system, is able to carry out these methods.

Computer program instructions or a computer program in the present context mean any expression, in any language, code (i.e., picocode instructions) or notation, of a set of instructions intended to cause a system having an information processing capability to perform a particular function either directly or after either or both of the following occur: (a) conversion to another language, code or notation; (b) reproduction in a different material form.

The invention may be tangibly embodied in a computer program residing on a computer-readable medium or carrier. The medium may comprise one or more of a fixed and/or removable data storage device such as a floppy disk or a CD-ROM, or it may consist of some other type of data storage or data communications device. The computer program may be loaded into memory to configure the computer for execution. The computer program comprises instructions which, when read and executed by the processor to perform the steps necessary to execute the steps or elements of the present invention.

While the invention has been described in combination with specific embodiments thereof, there are many alternatives, modifications, and variations that are likewise deemed to be within the scope thereof. Accordingly, the invention is intended to embrace all such alternatives, modifications and variations as fall within the spirit and scope of the appended claims.

The invention claimed is:

1. A method, comprising:
preserving atomic access requests from one or more processors to an arbiter without intervention from another request, wherein the arbiter includes a separate FIFO buffer for each bank within memory modules of a memory system, wherein at least one of the separate FIFO buffets has a depth that is equal to a number of outstanding requests and stores a type of access, an address and a data block height in addition to a number of the one or more processors when each of the one or more processors is not limited to only one outstanding request;
wherein the arbiter further includes a selection algorithm to choose one of the one or more processors requesting access to the memory system to be a winner, and to load an encoded value associated with the winner into all of the FIFO buffers associated with memory banks to be accessed by the request before choosing another winner wherein read and write requests are interleaved into different windows; and
wherein the arbiter further includes a function that accesses all of the data within one memory bank for a memory access request of the processor associated with an encoded value that is at a to of a FIFO buffer associated with a memory bank before accessing data within a memory bank for another general purpose processor and, thereby, access for a given block is atomic, and the access spans multiple banks, multiple addresses, and multiple memory modules of the memory system.

2. The method of claim 1, further including storing data in at least one row of at least one of the banks.

3. The method of claim 1, wherein the banks of each memory module are sequentially designated and accessed consecutively as designated.

4. The method of claim 3, wherein one set of consecutive accesses comprises a window requiring a fixed number of clock cycles.

5. The method of claim 4, wherein the arbiter designates each window as a "preferred read" or a "preferred write" window.

6. The method of claim 5, wherein the arbiter dedicates a window to a given designation if a top entry in any of the bank FIFO buffers associated with the memory module requests an operation matching the preference.

7. The method of claim 6, wherein the arbiter dedicates the window to an opposite operation if the top entry in all bank FIFO buffers associated with the memory module does not match the preference.

8. The method of claim 1, thither including using digital circuits to preserve atomic access of each request.

9. The method of claim 1, wherein each of the multiple processors is limited to one request to the arbiter; and a maximum depth of a queue in a FIFO buffer corresponds to a total number of processors allowed to access a given bank.

10. The method of claim 1, wherein the arbiter determines a winner of the access requests in a round-robin manner.

11. The method of claim 1, wherein an algorithm limits each processor to one request to the arbiter, thus limiting a maximum depth of a FIFO buffer queue to a total number of processors that are allowed to access a bank.

12. A method of enabling multiple processors to simultaneously request access to data blocks in a memory system shared by multiple processors, comprising:

using digital circuitry for preserving atomic access of each request from a processor to an arbiter without intervention by a request from another processor;

storing at least some of the data blocks, in at least one row of at least one bank in a memory module in the memory system, wherein each memory module comprises one or more banks of data and each bank has a one to one association with a FIFO buffer within the arbiter which stores memory access requests to the bank;

consecutively designating the banks of each memory module up to the total number of banks in the module;

accessing the banks consecutively in the order in which they are designated;

labeling one set of consecutive accesses as a window requiting a fixed number of clock cycles;

designating each window as a "preferred read" or a "preferred write" window, and dedicating the window to a given designation if a top entry in any of the bank FIFO buffers associated with the memory module requests an operation matching the preference;

wherein the arbiter includes a separate FIFO buffer for each bank within memory modules of a memory system, wherein at least one of the separate FIFO buffers has a depth that is equal to a number of outstanding requests and stores a type of access, an address and a data block height in addition to a number of the one or more processors when each of the one or more processors is not limited to only one outstanding request;

wherein the arbiter further includes a selection algorithm to choose one of the one or more processors requesting access to the memory system to be a winner, and to load an encoded value associated with the winner into all of the FIFO buffers associated with the memory banks to be accessed by the request before choosing another winner, wherein read and write requests are interleaved into different windows; and wherein the arbiter further includes a function that accesses all of the data within one memory bank for the memory access request of the processor associated with the encoded value that is at the top of the FIFO buffer associated with the memory bank before accessing data within the memory bank for another general purpose processor and, thereby, the access for a given block is atomic, and the access spans multiple banks, multiple addresses, and multiple memory modules of the memory system.

13. The method of claim 12, wherein the arbiter dedicates the window to an opposite operation if the top entry in all bank FIFO buffers associated with the memory module does nor match the "preferred read" or "preferred write" operation.

14. The method of claim 12, wherein for each bank in the memory a different FIFO is exclusively used.

15. A method for granting atomic access to data blocks in memory modules of a memory system shared by multiple processors, comprising the step of preserving atomic access of each request from a processor to an arbiter without intervention from another request, wherein the arbiter includes:

a separate FIFO buffer for each bank within the memory system, wherein at least one of the separate FIFO buffers has a depth that is equal to a number of outstanding requests and stores a type of access, an address and a data block height in addition to a number of the one or more processors when each of the one or more processors is not limited to only one outstanding request;

a selection algorithm to choose one of the one or more processors requesting access to the memory system to be a winner, and to load an encoded value associated with the winner into all of the FIFO buffers associated with the memory banks to be accessed by the request before choosing another winner, wherein read and write requests are interleaved into different windows; and a function that accesses all of the data within one memory bank for the memory access request of the processor associated with the encoded value that is at the top of the FIFO buffer associated with the memory bank before accessing data within the memory bank for another general purpose processor and, thereby, the access for a given block is atomic, and the access spans multiple banks, multiple addresses, and multiple memory modules.

* * * * *